United States Patent [19]

Sanford et al.

[11] Patent Number: 4,776,656
[45] Date of Patent: Oct. 11, 1988

[54] TE-TM MODE CONVERTER

[75] Inventors: Norman A. Sanford, Stillriver; William A. Dyes, Groveland; James M. Connors, Buzzards Bay, all of Mass.

[73] Assignee: Polaroid Corporation, Cambridge, Mass.

[21] Appl. No.: 43,085

[22] Filed: Apr. 27, 1987

[51] Int. Cl.⁴ .................................................. G02B 6/14
[52] U.S. Cl. ..................... 350/96.14; 350/96.12
[58] Field of Search ................ 350/96.11, 96.12, 96.13, 350/96.14

[56] References Cited

U.S. PATENT DOCUMENTS

| | | | |
|---|---|---|---|
| 4,220,395 | 9/1980 | Wang et al. | 350/96.12 |
| 4,533,207 | 8/1985 | Alferness | 350/96.12 X |
| 4,691,984 | 9/1987 | Thaniyavarn | 350/96.14 |
| 4,732,444 | 3/1988 | Papuchon et al. | 350/96.14 |

OTHER PUBLICATIONS

Haruna et al., "An Efficient TE-TM Mode Converter Using a Z-Propagation LiNbO₃ Waveguide", *The Transactions of the IECE of Japan*, vol. E 69, No. 4, Apr. 1986, pp. 418-419.

*Primary Examiner*—John Lee
*Attorney, Agent, or Firm*—Francis J. Caufield

[57] ABSTRACT

A TE-TM mode converter utilizes a Y-cut lithium niobate crystal which includes a straight titanium-diffused channel extending along the Z-axis of the crystal. A parallel pair of electrodes lie symmetrically on opposite sides of the channel. a.c. and d.c. voltage supplies are connected to the electrodes to supply voltages so as to effect complete conversion from one direction of polarization to the other direction of polarization of a wave applied as an input to one end of the channel for abstraction at the opposite end.

6 Claims, 1 Drawing Sheet

TE-TM MODE CONVERTER

FIELD OF THE INVENTION

This invention relates to an optical TE-TM mode converter.

BACKGROUND OF THE INVENTION

An electro-optic polarization converter is important for a variety of applications. For example, in a single-mode optical fiber system, it may serve as a polarization-controlling device for typical single mode fiber transmission systems in which the propagating waves normally do not preserve their initial linear polarization so that periodically restoration to a linearly polarized state of the waves becomes important.

In the January 1986 issue of Optics Letters, Vol. II, No. 1, pps. 39-41, there is described a TE-TM mode converter which employes an X-cut lithium niobate (LiNbO$_3$) crystal substrate in which there is provided a titanium in-diffused channel waveguide which supports one TE and one TM mode. The waveguide propagation direction is along the optic Z-axis of the crystal. The electro-optically induced linear polarization rotation is accomplished through the off-diagonal $r_{61}$ electro optic coefficient. The electrode structure for applying the electronic field for inducing the polarization conversion consists of three separate electrodes symmetrically located with respect to the waveguide and including a center electrode overlying the waveguide and a pair of outer electrodes, one on each side of the center electrode. One of the outer electrodes is grounded, and two independent voltages $V_1$ and $V_2$ are applied to the center electrode and other outer electrode, respectively. Voltage $V_1$ contributes a mainly vertical electric field component and $V_2$ a mainly horizontal field component inside the waveguide. By varying the $V_1$ and $V_2$ appropriately, conversion between the TE and TM modes of a single mode optical wave applied to one end of the waveguide is effected.

In this arrangement, the vertical electric field provided by $V_1$ provides the electro-optically induced TE-TM mode coupling through the off diagonal $r_{61}$ electro optic coefficient, and the electric field provided by the voltage $V_2$ is used to provide the necessary electro-optically induced phase shifts between the TE and TM modes through the complementary $r_{22}$ and $r_{12}$ electro optic coefficients. Since the wavelength propagation direction is along the optic axis, both TE and TM modes see the same ordinary index and are therefore already nearly phase-matched.

This device has several drawbacks. Firstly, optical isolation needs to be provided between the central electrode and the underlying waveguide. This typically involves use of a buffer layer between the LiNbO$_3$ substrate and the overlying electrodes which makes for processing complexity.

Additionally, the performance is extremely sensitive to the electrode alignment. Accurately aligning the three electrodes, typically separated by a few microns, makes for manufacturing complexity.

It is desirable to provide a mode converter having a less complex structure than the structure discussed herein above.

SUMMARY OF THE INVENTION

We have discovered that a simpler structure is possible with a Y-cut crystal, for example, a Y-cut lithium niobate crystal. With such a structure, mode conversion can be effective with a two-electrode structure, including only a pair of electrodes symmetrically disposed about a diffused waveguide channel extending along the optic Z-axis of the crystal, with no electrode overlying the waveguide.

BRIEF DESCRIPTION OF THE DRAWINGS

The invention will be better understood from the following detailed description taken with the accompanying drawings wherein.

DETAILED DESCRIPTION

Figure 1:
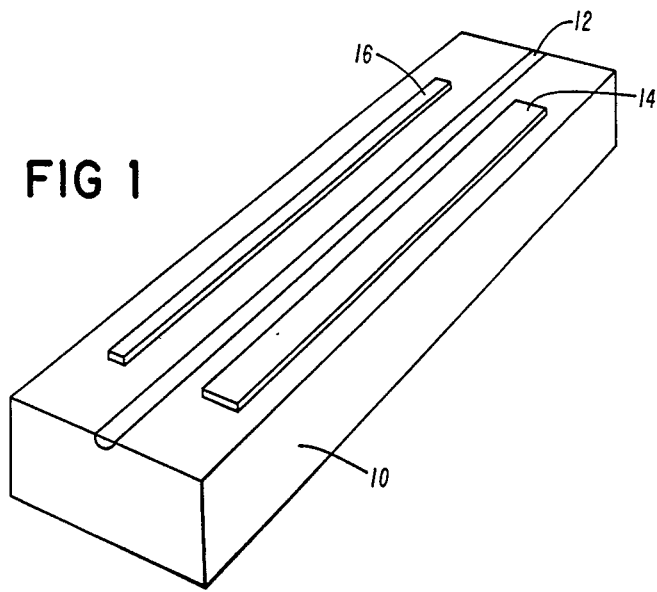
FIG. 1 is a perspective view of an illustrative embodiment of the invention.

FIG. 1 shows a Y-cut LiNbO$_3$ crystal 10 in which in known fashion titanium has been thermally diffused to form the waveguiding channel 12 along the length of the crystal in the direction of the optic Z axis of the crystal.

Typically, the titanium strip deposited was about 480 Angstroms thick and about 3 microns wide and its in-diffusion carried out in flowing oxygen at about 1100° C. for about six hours. Ramp time to the diffusion temperature was about five hours as was the ramp time back to the ambient.

There were then deposited symmetrically on either side of the channel 12, parallel electrodes 14 and 16, typically of gold about 20 millimeters in length and separated by a gap of about 7 microns. The widths of the electrodes advantageously are chosen to match the impedance of the electrodes to the drive voltage supply. In a typical embodiment, electrode 16 was between 5 and 10 microns wide and electrode 14, which served as the ground plane, was about 1 millimeter wide. The crystal length was about 24 millimeters.

The input wave, illustratively of a wavelength of 0.632 or 0.820 micrometers, was applied at one end of the channel by way of an optical fiber (not shown) and the converted output wave abstracted at the other end similarly by way of an optical fiber (not shown). Significantly, neither of electrodes 14 or 16 overlaps the channel 12 which is uncovered and need not be buried in the interior of the crystal.

Figure 2:
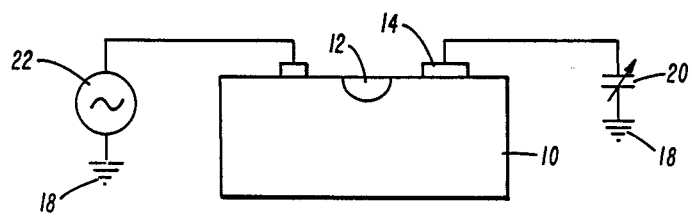
FIG. 2 shows a cross-section of the embodiment of FIG. 1, connected to illustrative control circuitry.

FIG. 2 depicts a cross-section of the crystal 10 showing the channel 12 at the top surface and the electrode 14 and 16, disposed on opposite sides of the channel. Electrode 14 is connected to ground 18 by way of the variable d.c. power supply source 20 and electrode 16 by way of a.c. voltage source 22. The frequency of the source may vary widely depending on the application. For use as a d.c. polarization switch, the frequency typically would be quite low; for use in a high-frequency modulator, the frequency might be as high as gigahertzs.

The specific values of d.c. bias and a.c. drive for a single essentially complete exchange between modes for a given length of electrodes is best determined empirically. For the structure described, using a twenty millimeter interaction length, it was found advantageous for 95% exchange at a wavelength of 0.632 microns to operate with an a.c. drive of about five volts peak-topeak and a d.c. bias of between fifteen and twenty volts. With an input of 0.820 microns, a peak-to-peak drive voltage of about 12 volts was found suitable for a bias between fifteen to twenty volts.

The relative magnitudes of the d.c. bias and a.c. drive are chosen to insure an operating point of high conversion efficiency. As will be discussed below in connection with FIG. 3, for high conversion efficiency, it is desirable to maintain continuously at least a several volts difference between the two electrodes. It is feasible to work with d.c. biases as low as five volts if the a.c. drive is adjusted appropriately. It usually is of little advantage to operate with biases greater than twenty volts.

Figure 3:
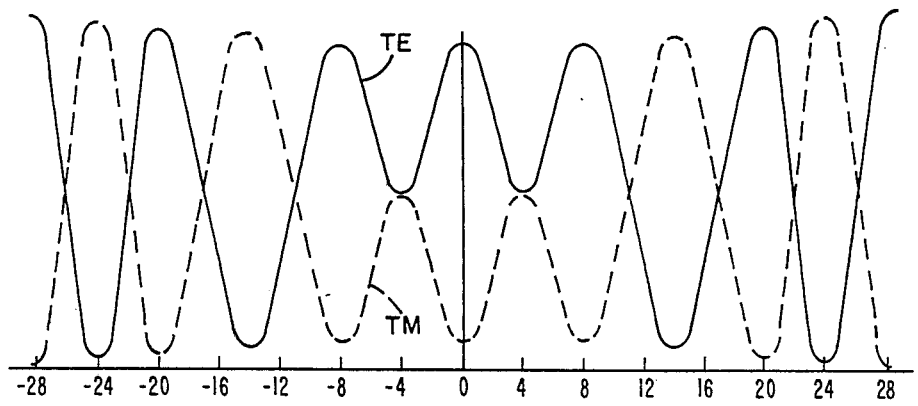
FIG. 3 is a plot of the relative magnitudes of the TE and TM components measured at the output end of the embodiment of FIG. 2 as the drive voltage is varied.

In FIG. 3, there is plotted the relative magnitudes of the TE component shown by the solid line and the TM component shown by the broken line, measured at the output end of the waveguiding channel of a fixed length as perturbing voltage ie., the d.c. bias voltage, is varied.

As is indicated, for values of perturbing voltage below about four volts the conversion between modes is substantially incomplete while at higher voltages a high degree of conversion is obtained.

A variety of applications are know for a mode converter of the kind described. For example, it can be used simply to convert an input wave of one linear polarization essentially completely to the opposite polarization by using an interaction length matching a complete conversion length.

Alternatively by using an interaction length one half that for complete transfer, a linearly polarized input wave can be converted to a nearly circularly or elliptically polarized wave. Additionally, the interaction length can be chosen to be of sufficient length only to effect a desired degree of conversion, for example, just enough to provide a desired degree of compensation in a wave which was initially linearly polarized, but whose polarization was degraded in transmission, as often occurs to a wave during transmission along an optical fiber.

Similarly, it is well known to follow a mode converter with a linear polarizer to form an efficient modulator.

Alternatively, mode conversion can be used in a modulator to convert a guided mode of one polarization into a lossy mode of orthogonal polarization as described in application Ser. No. 043,190 (Our Case No. 7337) having a common assignee and a common filing date.

It is to be understood that various modifications can be made in the specific illustrative embodiment described consistent with the invention. For example, it is feasible to form the waveguiding channel in other fashions, for example, by the electro-diffusion of copper. Additionally, other materials may be substituted for the lithium niobate of the crystal, for example, lithium tantalate or other suitable materials which permits a guided structure which essentially supports only one TE mode and one TM mode. The suitability of a particular material can be determined empirically.

Similarly, other arrangements may be used for supplying and abstracting the light from the crystal, for example, by use of an objective lens for focusing or expanding the light.

Various other arrangements may be used for superimposing the a.c. voltage on the d.c. voltage. For example, the voltage supply arrangement may be modified to include a d.c. voltage supply and an a.c. drive voltage supply in series between one electrode and ground, and to ground the other electrode.

Alternatively, if one chooses to use the device simply as a modulator, the operating point may be set by adjusting the input polarization appropriately which supplying only an a.c. drive to the electrodes. Subsequent separation of the output polarizations with a polarizer results in both TE and TM components being amplitude modulated.

What is claimed:

1. An optoelectric mode conversion device consisting of a y-cut, z-propagating ferroelectric crystalline substrate with electrooptic properties, said substrate having formed therein a channel waveguide parallel to its z-axis, said channel waveguide being structure to support one TE mode of a predetermined wavelength with its state of polarization parallel to the x-z plane of said substrate and one TM mode at said predetermined wavelength with its state of polarization perpendicular to the x-z plane of said substrate where said TE and TM modes are substantially degenerate having nearly equal phase velocities; and a single pair of electrodes symetrically disposed about said channel waveguide on the x-z surface of said substrate and extending parallel to its z-axis, said electrodes being adapted to supply voltage to said substrate to create an electric field across said channel waveguide to change the optical properties thereof by electrooptic effect, said electric field comprising a DC bias component operative to match the phase velocities of said TE and TM modes and an AC component for converting between said TE and TM modes.

2. The device of claim 1 further including a DC bias voltage supply and an AC voltage supply connected to said electrodes to create said electric field across said channel waveguide.

3. The device of claim 1 in which said substrate is of lithium niobate and said channel waveguide is a titanium-diffused region.

4. An optoelectric mode conversion device consisting of a y-cut, z-propagating ferroelectric crystalline substrate with electrooptic properties, said substrate having formed therein a channel waveguide parallel to its z-axis, said channel waveguide being structured to support one TE mode of a predetermined wavelength with its state of polarization parallel to the x-z plane of said substrate and one TM mode at said predetermined wavelength with its state of polarization perpendicular to the x-z plane of said substrate where said TE and TM modes are substantially degenerate having nearly equal phase velocities;

means for applying to one end of said channel waveguide an input wave which includes a linearly polarized mode for conversion to another mode of orthogonal polarization; and a single pair of electrodes symetrically disposed about said channel waveguide on the x-z surface of said substrate and extending parallel to its z-axis, said electrodes being adapted to supply voltage to said substrate to create an electric field across said channel waveguide to change the optical properties thereof by electrooptic effect, said electric field comprising a DC bias component operative to match the phase velocities of said TE and TM modes and an AC component for converting between said TE and TM modes.

5. The device of claim 4 in which said substrate is of lithium niobate, said channel waveguide is a titanium-diffused region formed in the top surface of said substrate, and said pair of electrodes extend the length of said channel waveguide.

6. The device of claim 5 in which the supplied voltages are such that over the length of said channel waveguide there is a complete exchange of said input wave from one direction of linear polarization to the orthogonal direction of linear polarization.

* * * * *